United States Patent [19]

Tsuchiya et al.

[11] Patent Number: 4,968,399

[45] Date of Patent: Nov. 6, 1990

[54] MULTIPLE ELECTROCOATING PROCESS

[75] Inventors: Yasuyuki Tsuchiya, Hirakata; Kenshiro Tobinaga, Kawanishi, both of Japan

[73] Assignee: Nippon Paint Co., Ltd., Osaka, Japan

[21] Appl. No.: 140,664

[22] Filed: Jan. 4, 1988

[30] Foreign Application Priority Data

Jan. 7, 1987 [JP] Japan ................................. 62-1335

[51] Int. Cl.⁵ .............................................. C25D 13/00
[52] U.S. Cl. ................................. 204/181.1; 204/181.9
[58] Field of Search ........................... 204/181.1, 181.9

[56] References Cited

U.S. PATENT DOCUMENTS

| | | | |
|---|---|---|---|
| 4,101,486 | 7/1978 | Bosso | 204/181.7 |
| 4,175,018 | 11/1979 | Gacesa | 204/181.6 |
| 4,208,262 | 6/1980 | Kubo | 204/181.1 |
| 4,333,807 | 6/1982 | Suzuki | 204/181.1 |
| 4,336,177 | 6/1982 | Backhouse | 523/201 |
| 4,376,849 | 3/1983 | Kempter | 204/181.7 |
| 4,543,376 | 9/1985 | Schupp | 523/414 |
| 4,622,116 | 11/1986 | Elton | 204/181.1 |
| 4,716,182 | 12/1987 | Hess | 524/714 |

FOREIGN PATENT DOCUMENTS 0102196 7/1984 European Pat. Off. .
54-66946 5/1979 Japan ................. 204/181.1

Primary Examiner—T. Tung
Assistant Examiner—Isabelle R. McAndrews
Attorney, Agent, or Firm—Wenderoth, Lind & Ponack

[57] ABSTRACT

Disclosed is a multiple electrocoating process comprising coating once or more on a substrate a first electrocoating composition, coating a second electrocoating composition on the uncured first electrocoating composition and then curing all electrodeposited coatings, characterized in that the first electrocoating composition is an aqueous dispersion containing micro gel particles having an electric charge which is specifically prepared; and the second electrocoating composition comprises an anionic or cationic film-forming aqueous resin (C) and a thermosetting crosslinking agent (D) which is self-crosslinked or crosslinked with said aqueous resin (C).

13 Claims, No Drawings

MULTIPLE ELECTROCOATING PROCESS

FIELD OF THE INVENTION

The present invention relates to a multiple electrocoating process comprising coating once or more on a substrate a first electrocoating composition, coating a second electrocoating composition on the uncured first electrocoating composition and then curing all electrodeposited coatings.

BACKGROUND OF THE INVENTION

Electrocoating is a process wherein a film-forming resin having an electric charge is dispersed in an aqueous medium and electrophoretically moved onto an electrical conductive substrate when a voltage is applied between the substrate and the other electrode to form a deposited film on the substrate. In this process, it is difficult to electrocoat two or more times to obtain a thick film, because the deposited film during electrocoating is an insulating film so as to inhibit its electrical conductivity.

In order to ensure the electrical conductivity of the deposited film, it has been proposed that a material having electrical conductivity, such as metal or carbon powder, be formulated into the electrocoating composition. It, however, is required to add the electrically material conductive to the coating in a large amount to obtain a sufficient conductivity, thus remarkably deteriorating the film properties.

BRIEF EXPLANATION OF PRIOR ART

Japanese Patent Publication (examined) No. 15559/1980 and Japanese Patent Publication (unexamined) No. 140552/1977 disclose an electrocoating process wherein a first electrocoating composition is coated on a substrate and a second electrocoating composition containing a pigment or ground particles in a high amount is coated thereon.

In these processes, the second coating has to be done while the first coated film has lower insulating properties. If not, it is difficult to deposit the second coating, thus obtaining a thin coated film.

SUMMARY OF THE INVENTION

It has been found that when an aqueous dispersion of micro gel particles having electric charges on the surface is employed in the electrocoating composition this obviates the above mentioned problems.

The present invention provides a multiple electrocoating process comprising coating substrate, one or more times with a first electrocoating composition, coating a second electrocoating composition on the uncured first electrocoating composition and then curing all electrodeposited coatings, characterized in that the first electrocoating composition is an aqueous dispersion containing micro gel particles having an electric charge, which is prepared by;
emulsifying in an aqueous medium a resin composition comprising
 (A) 100 parts by weight of an anionic or cationic film-forming aqueous resin, and
 (B) 10 to 250 parts by weight of a thermosetting crosslinking agent which is self-crosslinked or crosslinked with said aqueous resin (A) in terms of condensation or addition reaction; said parts by weight being based on the solid content of the resin composition, and
heating the resultant emulsion to above a crosslinkable temperature of said crosslinking agent (B); and
 the second electrocoating composition comprises an anionic or cationic film-forming aqueous resin (C) and a thermosetting crosslinking agent (D) which is self-crosslinked or crosslinked with said aqueous resin (C).

The micro gel particles which have an electric charge are deposited on a substrate to form a micro gel particle layer. The micro gel particle layer has many apertures between the particles, through which an electric current flows to enable electrocoating the substrate two times or more.

DETAILED DESCRIPTION OF THE INVENTION

According to the present invention, the first electrocoating composition is an aqueous dispersion containing micro gel particles having an electric charge. The electric charge should be anionic for anionic electrocoating, which fall in the film-forming resins (A) and (C) which are anionic, and it should be cationic for cationic electrocoating, which fall in the film-forming resins (A) and (C) which are cationic.

The anionic resin (A) used for the anionic electrocoating composition has an anionic functional group which gives a negative charge and hydrophilic nature to the resin. Examples of the anionic functional groups are a carboxyl group, a sulfonic acid group, a phosphate group and the like. Such resins are known to the art and all of them can be used in the present invention. Preferred anionic aqueous resins are a maleic natural or synthetic drying oil, a maleic polybutadiene resin, a half ester or half amide thereof, an anionic acrylic resin and the like.

The maleic oil can be prepared by reacting 30 to 300 mmol of maleic anhydride with 100 g of a natural or synthetic drying oil, or a natural or synthetic half-drying oil having an iodine value of not less than 100.

The maleic polybutadiene can be prepared by reacting 30 to 300 mmol of maleic anhydride with 100 g of a liquid polybutadiene having a molecular weight of 500 to 5,000.

The maleic oil and maleic polybutadiene may be used in the form of a dicarboxyl type, a half ester type or a half amide type, which is generally obtained by reacting it with water, an alcohol, a primary or secondary amine.

The anionic acrylic resin can be prepared by copolymerizing a (meth)acrylate with an ethylenically unsaturated monomer having an acid group and optionally another ethylenically unsaturated monomer. Examples of the (meth)acrylates are methyl (meth)acrylate, ethyl (meth)acrylate, butyl (meth)acrylate, hexyl (meth)acrylate, 2-ethylhexyl (meth)acrylate, lauryl (meth)acrylate, 2-hydroxyethyl (meth)acrylate, glycidyl (meth)acrylate and the like. Examples of the ethylenically unsaturated monomers having an acid group are (meth)acrylic acid, crotonic acid, itaconic acid, maleic anhydride, sulfoacrylate, mono(2-hydroxyethylacrylate)acid phosphate and the like. The other ethylenically unsaturated monomer which is an optional component includes styrene, vinyl toluene, acrylonitrile, acrylamide, vinyl acetate and the like. Representative examples of the anionic acrylic resin are commercially available from Toray Industries Inc. as Coatax WE-804, and Coatax WE-832.

The cationic resin (A) has a cationic functional group which is given a positive charge and hydrophilic nature to the resin, such as an amino group. Such resins are known to the art and all of them can be used in the present invention. Preferred aqueous resins are an epoxy resin having amino groups and a polybutadiene resin having amino groups (hereinafter referred to as "aminated polybutadiene").

The epoxy resin having amino groups may be prepared by reacting a polyglycidyl compound with a primary or secondary amine. The polyglycidyl compound herein is meant an epoxy compound which has at least two glycidyl groups in one molecule. The compound may be obtained by reacting an aromatic or aliphatic alcohol with epihalohydrin. Such polyglycidyl compounds are commercially available, for example, bisphenol type from Toto-kasei K.K. as Epototo YD-011; aliphatic type from Nagase-kasei K.K. as Denacol EX-212 and from Toto-kasei K.K. as PG-207; and phenol novolak type from Toto-kasei K.K. as Epototo YDPN-638. Examples of the primary or secondary amines to be added to the polyglycidyl compounds are primary amines, such as monomethylamine, monoethylamine, n-butylamine, monoethanolamine and the like; and secondary amines, such as dimethylamine, diethylamine, diisopropylamine, N-methylethanolamine, N-ethylethanolamine, diethanolamine and the like. The amines may be diketimine which is obtained by dehydration-reation of diethylenetriamine and methyl isobutyl ketone. The amines generally are reacted with the polyglycidyl compounds in an equivalent amount approximately equal to an epoxy equivalent amount of the polyglycidyl compound.

The aminated polybutadiene may be prepared by oxidizing liquid polybutadiene having a molecular weight of 500 to 5,000 with an peroxide in an amount ratio sufficient to form 3 to 12% by weight of an oxirane oxygen atom, followed by reacting the resultant polybutadiene with a primary or secondary amine in an amount of 30 to 300 mmol per 100 g of the polybutadiene. Details of such an aminated polybutadiene are described in Japanese Patent Publication (unexamined) Nos. 60273/1985 and 60274/1985. The polybutadiene can form an aqueous solution or aqueous dispersion by neutralizing an acid and then diluting with water.

The thermosetting crosslinking agent (B), which can be self-crosslinked or crosslinked with the aqueous resin (A) in terms of condensation or addition reaction, includes etherified methylol phenols, preferably beta-hydroxyphenol ethers, for cationic electrocoating; as well as melamine resins, methylolphoenols, etherified methylolphenols for anionic electrocoating; and the like. When the aminated polybutadiene contains remaining oxirane oxygen atoms, the etherified methylolphenols may combined with tetrabromobisphenol A.

The methylolphenols are those obtained by reacting phenols, such as phenol, p-cresol, p-t-butylphenol, amilphenol, p-phenylphenol and bisphenol A, with formaldehyde in the presence of an alkali catalyst. The etherified methylolphenols are generally prepared by partially or completely etherifying the phenolic OH group of the methylolphenols with a suitable etherifying agent. Examples of the etherifying agents are a monoepoxy compound, such as; and a compound having the following formula:

R—X wherein R represents methyl, allyl, benzyl, oxirane and the like, and X represents a halogen atom. In case where the etherifying agent is the monoepoxy compound, the product reacted is beta-hydroxyphenol ether which is highly reactive and this is preferred.

The melamine resins may be a methylol type compound which is prepared by reacting melamine, benzoguanamine, acetoguanamine or a mixture thereof with formaldehyde. It may also be prepared by etherifying at least a portion of the methylol group of the methylol type compound with a lower alcohol having 1 to 4 carbon atoms.

The crosslinking agent (B) should be reactive at a temperature of less than about 100° C. at atmospheric pressure, because crosslinking reaction is conducted in an aqueous medium. However, if the reaction is conducted under pressure in an autoclave, the crosslinking agent may be one which is reactive at more than 100°C.

For lowering the viscosity of the resin composition of the aqueous resin (A) and the crosslinking agent (B) to emulsify with ease, the aqueous medium may further contain an organic solvent. Examples of the organic solvent are a water-miscible organic solvent, such as ethylene glycol monoethyl ether, ethylene glycol monopropyl ether, ethylene glycol monobutyl ether, methanol, ethanol, isopropyl alcohol, n-butanol, isobutanol, ethylene glycol dimethyl ether, diacetone alcohol, 4-methoxy-4-methylpentanone-2, acetone, methyl ethyl ketone, methoxy butanol, dioxane, ethylene glycol monoethyl ether acetate and the like; and a water-immiscible organic solvent, such as xylene, toluene, methyl isobutyl ketone, hexane, carbon tetrachloride, 2-ethylhexanol, ethylhexanol, isophorone, cyclohexane, benzene and the like.

For promoting the crosslinking reaction, the resin composition of the aqueous resin (A) and crosslinking agent (B) may further contain a catalyst. In case where the crosslinking agent is beta-hydroxyphenol ether, preferred catalysts are dinonylnaphthalene sulfonic acid and dinonylnaphthalene disulfonic acid. When the crosslinking agent (B) is the melamine resin, the catalysts are preferably dinonylnaphthalene sulfonic acid and dinonylnaphthalene disulfonic acid.

Where the resin composition containing the aqueous resin (A) and the crosslinking agent (B) is emulsified in an aqueous medium, at least 20 mol % of the amino group or acid group in the aqueous resin (A) is primarily neutralized with an acid or base and then emulsified with the crosslinking agent (B) and the aqueous medium. An amount of the crosslinking agent (B) may be 10 to 250 parts by weight per 100 parts by weight of the aqueous resin (A), calculated in terms of the solid content. The acid for neutralizing the cationic aqueous resin (A) includes acetic acid, propionic acid, lactic acid and the like. The base for neutralizing the anionic aqueous resin (A) includes ammonia, diethanolamine, triethanolamine, methylethanolamine, N,N-dimethylethanolamine, N,N-diethylethanolamine, diethylamine, triethylamine, morphorine, potassium hydroxide and the like.

The aqueous medium is primarily water. It can contain a surfactant for facilitating emulsification. Examples of the surfactants are a nonionic surfactant, such as polyethylene glycol alkylphenyl ether, polyethylene glycol alkyl ether, polyoxyalkylene alkyl ether, polyethylene glycol sorbitane monostearate, polypropylene glycol polyethylene glycol ether and the like; a cationic surfactant, such as lauryltrimethylammonium chloride, distearyldimethylammonium chloride, alkylpicolinium chloride and the like; and an anionic surfactant, such as polyoxyethylene alkylphenyl ether sulfate ammonium salt, polyoxyethylene alkyl ether sulfate ammonium salt and the like. The nonionic or cationic surfactant may be suitable to the cationic electrocoating process and the anionic or nonionic one may be suitable to the anionic electrocoating process.

It is preferred that the solvent in the emulsion is azeotropically removed from the emulsion before or during heating thereafter. Removal of the solvent may facilitate crosslinking reaction.

The emulsion thus obtained is heated to above a crosslinkable temperature at atmospheric pressure or under pressure in accordance with the sort of the crosslinking agent (B) to obtain an aqueous dispersion of the cationic micro gel particle of the present invention.

The micro gel particle has an electric charge on the surface and stably dispersed in water due to its repulsion force. The obtained emulsion has stable to heat and therefore can proceed the crosslinking reaction of the crosslinking agent (B). The termination of crosslinking reaction can be identified by adding a solvent capable of dissolving a resin, such as tetrahydrofuran When crosslinking reaction does not occur, the emulsion turns to transparent, and if crosslinking reaction is conducted, the solution turns to turbid white. The obtained aqueous dispersion of the micro gel particle having an electric charge can be used in neat or the micro gel particle which is taken out from the dispersion by vacuum drying can also be used.

In another embodiment of the present invention, a solid particle is added in the emulsion before heating to form a micro gel particle containing a solid particle as a core. The wording "micro gel particle dispersion" herein intended to cover such a dispersion containing a micro gel particle containing a solid particle therein as a core. The solid particle for this embodiment is a particle which is not dissolved with both the crosslinking agent and an organic solvent therein and includes a pigment and a crosslinked gel particle. Examples of the pigments are iron oxide, strontium chromate, zinc chromate, carbon black, titanium dioxide, talc, aluminum silicate, precipitated barium sulfate, basic lead sulfate, aluminum phosphomolybdate, a metallic pigment such as zinc powder, and an extender pigment.

The aqueous dispersion containing the cationic micro gel particle can be used as the first electrocoating composition. The first coating composition may contain a pigment as a separate component, that is, the pigment does not form a core of the micro gel particle. Examples of the pigments are a color pigment, such as titanium dioxide, iron oxide red, carbon black and the like; an extender pigment, such as aluminum silicate, precipitated barium sulfate and the like; and a corrosion-preventive pigment, such as aluminum phosphomolybdate, strontium chromate, basic lead silicate, lead chromate and the like. The electrocoating composition preferably adjusts the solid content to 10 to 20% by weight.

According to the present invention, the second electrocoating composition comprises a cationic or anionic film-forming aqueous resin (C) and a thermosetting crosslinking agent (D) which is self-crosslinked or crosslinked with said aqueous resin (C). The film-forming resin (C) and crosslinking agent (D) can be those conventionally used in this field. Preferred are the same as the aqueous resin (A) and the crosslinking agent (B). In the second electrocoating composition, no heating treatment is effected and therefore it does not contain any resin particles.

In the electrodeposition process employing the first and second electrocoating composition, they are placed in contact with an electrical conductive anode and an electrical conductive cathode with the surface to be coated being cathode for cationic electrocoating or being anode for anionic coating. While in contact with the electrocoating composition, an adherent film of the electrocoating composition is deposited on the electrode when a voltage is impressed between the electrodes. The conditions under which electrodeposition is carried out are, in general, similar to those used in electrodeposition of other types of coatings. The applied voltage may be varied greatly and can be, for example, as low as one volt to as high as several thousand volts, but typically is between about 50 to 500 volts. The current density is usually between 50mA/cm$^2$ to 1 mA/cm$^2$.

After the first electrocoating composition is applied once or more and the second one is applied, the deposited films are cured at a temperature of 80° to 200° C., preferably 120° to 180° C. for 5 to 180 minutes, preferably 15 to 40 minutes.

The first electrocoating composition of the present invention contains the micro gel particles having an electric charge by which the particles are moved onto the surface of a substrate when a voltage is impressed. The particles on the substrate form many apertures through which the current of electricity is not injured, and therefore another electrocoating composition can be applied thereon to make coating thick. If the particles contain solid particles therein, such as inorganic pigments and the like, the deposited film can exhibit chemical or other functions present in the solid particles, such as corrosion resistance and the like.

EXAMPLES

The present invention is illustrated by the following examples, which are not to be construed as limiting the invention to their details. In the examples, part and % are based on weight unless otherwise indicated.

Production Example 1

Maleic polybutadiene resin

A maleic polybutadiene resin was prepared from the following ingredients.

| Ingredients | Weight (g) |
| --- | --- |
| Nisseki Polybutyadiene B-1500[1] | 1000 |
| Antigen 6C[2] | 10 |
| Maleic anhydride | 250 |
| Deionized water | 20 |
| Diethylamine | 0.5 |
| Propylene glycol | 100 |
| Ethylene glycol monoethyl ether | 340 |

[1]Polybutadiene having Mn 1500, vinyl 65%, trans 14% and cis 16, available from Nippon Petrochemicals Co. Ltd.
[2]N-methyl-N'-(1,3-dimethylbutyl)-p-phenylenediamine available from Sumitomo Chemical Industries Inc.

Nisseki Polybutadiene B-1500 was charged in a 2 liter flask having a condenser to which Antigen 6C and maleic anhydride were added. The content was kept at 190° to 200° C. with stirring to conduct an addition reaction of maleic acid to polybutadiene. After about 5 hours from the beginning of the heating, it was identified by a color reaction of dimethylaniline to finish the addition reaction. The reaction mixture was cooled to 100° C., and a mixture of deionized water and diethylamine was added dropwise over about 30 minutes. After finishing the addition, mixing continued for about one hour to obtain an acid value of 140. Then, propylene glycol was added to the reaction mixture and the reaction was conducted at 110° C. for 3 hours to obtain an acid value of 125. Next, ethylene glycol monoethyl ether was added and mixed at 80° C. for about one hour to finish a synthesis. The obtained vanish had a nonvolatile content of 80%.

Production Example 2

A half esterified maleic polybutadiene resin

A half esterified maleic polybutadiene resin was prepared from the following ingredients.

| Ingredients | Weight (g) |
|---|---|
| Nisseki Polybutadiene B-1000* | 1000 |
| Antigen 6C | 1 |
| Maleic anhydride | 265.8 |
| Xylene | 10 |
| Ethylene glycol monoethyl ether | 212.4 |

*Polybutadiene having Mn 1000, 1,2 bond 60%, available from Nippon Petrochemicals Co. Ltd.

Nisseki Polybutadiene B-1000, maleic anhydride, xylene and Antigen 6C were charged in a 2 liter flask having a condenser and reacted at 190° C. for 5 hours in a nitrogen blanket. The unreacted maleic anhydride and xylene were distilled away under reduced pressure to obtain a maleic polybutadiene having an acid value of 214 mmol/100 g.

Next, 1,000 g of the obtained maleic polybutadiene and ethylene glycol monoethyl ether were poured into a 2 liter separable flask equipped with a condenser and reacted for 2 hours to obtain a half esterified maleic polybutadiene.

Production Example 3

Beta-hydroxyphenol ether compound

Beta-hydroxyphenol ether compound was prepared from the following ingredients.

| Ingredients | Parts by weight |
|---|---|
| Tamanol 722[1] | 60 |
| Butyl glycidyl ether | 23 |
| n-Butanol | 10 |
| Methoxybutanol | 10 |
| Dimethylbenzylamine | 0.4 |

[1] A resol type phenol resin available from Arakawa Kagaku K.K.

Tamanol 722 was charged in a reaction vessel to which methoxybutanol and n-butanol were added and then butyl glycidyl ether was added. The content was mixed uniformly and a temperature rises to 100° C., at which temperature dimethylbenzylamine was added to the content. Mixing was continued at 100° C. for 3 hour with paying attention to a rapid elevation of temperature, after which an amount of the glycidyl group of the reaction product was measured to find less than 5% of the charged amount. The content was cooled to conduct an analysis The analysis showed that phenolic OH group disappears and beta-hydroxyphenol ether compound having a methylol group and a secondary alcohol group was obtained.

Production Example 4

Aminated polybutadiene A

An epoxidized polybutadiene having an oxirane oxygen atom of 6.4% was prepared by epoxidizing polybutadiene having a number average molecular weight of 2,000 and 1,2-bond of 65% (available from Nippon Petrochemicals Co. Ltd. as Nisseki Polybutadiene B-2000) with peracetate.

Next, 1,000 g of the epoxidized polybutadiene and 354 g of ethylene glycol monoethyl ether were charged in a 2 liter autoclave and 62.1 g of dimethylamine was added to react at 150° C. for 5 hours. Unreacted dimethylamine was removed by distillation to obtain an aminated polybutadiene. The aminated polybutadiene had an amine value of 120 mmol/100 g (solid content) and a nonvolatile content of 75%.

Production Example 5

An aqueous dispersion paste A was prepared from the following ingredients.

| Ingredients | Parts by weight | Solid content % |
|---|---|---|
| Strontium chromate | 25 | 25 |
| Yuuban 22R* | 50 | 25 |
| Maleic polybutadiene resin of Production Example 1 | 62.5 | 50 |
| Cobalt naphthenate | 1.67 | 1.67 |
| Triethylamine | 6.1 | |
| Deionized water | 363 | |

*n-Butylated melamine resin available from Mitsui Toatsu Chemicals Inc.

Strontium chromate was mixed with Yuuban 22R and glass beads, and ground by a sand mill. Maleic polybutadiene resin, cobalt naphthenate and triethylamine were added and then emulsified by slowly adding deionized water. Deionized water was further added to the emulsion, while the solvent was removed under reduced pressure. The resultant aqueous dispersion paste A was allowed to stand at 55° C. for 7 days and then cool.

Production Example 6

An aqueous dispersion paste B was prepared from the following ingredients.

| Ingredients | Parts by weight | Solid content % |
|---|---|---|
| Strontium chromate | 25 | 25 |
| Beta-hydroxyphenol ether compound | 36.75 | 25 |
| Maleic polybutadiene resin | 62.5 | 50 |
| Cobalt naphthenate | 1.67 | 1.67 |
| Triethylamine | 6.1 | |
| Deionized water | 376 | |

A aqueous dispersion paste B was obtained as generally described in Production Example 5 with the exception that 50 parts by weight of U-ban 22R was changed to 36.75 parts by weight of beta-hydroxyphenyl ether compound of Production Example 3 and an amount of deionized water was changed to 376 parts by weight.

Production Example 7

An aqueous dispersion paste C was prepared from the t following ingredients.

| Ingredients | Parts by weight | Solid content % |
|---|---|---|
| Strontium chromate | 25 | 25 |
| Yuuban 22R | 50 | 25 |
| Coatax WE-804* | 90.9 | 50 |
| Cobalt naphthenate | 1.67 | 1.67 |
| Triethylamine | 1.4 | |
| Deionized water | 340 | |

*A water soluble anionic acrylic resin available from Toray Industries Inc.

A aqueous dispersion paste C was obtained as generally described in Production Example 5 with the exception that 62.5 parts by weight of maleic polybutadiene resin was changed to 90.9 parts by weight of Coatax WE 804, the amount of triethylamine was changed to 1.4 and the amount of deionized water was changed to 376 parts by weight.

Production Example 8

An aqueous dispersion paste D was prepared from the following ingredients.

| Ingredients | Parts by weight | Solid content % |
|---|---|---|
| Strontium chromate | 25 | 25 |
| Beta-hydroxy phenol ether compound of Production Example 2 | 36.75 | 25 |
| Aminated polybutadiene A of Production Example 4 | 66.7 | 50 |
| Cobalt naphthenate | 1.67 | 1.67 |
| Acetic acid | 1.8 | |
| Deionized water | 382 | |

Strontium chromate was mixed with beta-hydroxyphenol either compound and glass beads, and ground by a sand mill. Aminated polybutadiene A, cobalt naphthenate and acetic acid were added and then emulsified by adding deionized water. Deionized water was further added to the emulsion, while the solvent was removed under reduced pressure. The resultant aqueous dispersion paste D was allowed to stand at 55° C. for 7 days and then cooled.

Production Example 9

An aqueous dispersion paste E was prepared from the following ingredients.

| Ingredients | Parts by weight | Solid content % |
|---|---|---|
| Strontium chromate | 25 | 25 |
| Aminated polybutadiene of Production Example 4 | 66.7 | 50 |
| Tetrabromobisphenol A | 25 | 25 |
| Xylene | 10 | |
| Ethylene glycol monobutyl ether | 10 | |
| Ethylene glycol monoethyl ether | 5 | |
| Cobalt naphthenate | 1.67 | 1.67 |
| Acetic acid | 1.8 | |
| Deionized water | 363 | |

Strontium chromate was mixed with aminated polybutadiene and ground by a sand mill. A solution dissolving tetrabromobisphenol A with xylene, ethylene glycol monobutyl ether and ethylene glycol monoethyl ether were added and then cobalt naphthenate and acetic acid were added and mixed uniformly. The mixture was then emulsified by adding deionized water. Deionized water was further added to the emulsion, while the solvent was removed under reduced pressure. The resultant aqueous dispersion paste E was allowed to stand at 55° C. for 7 days and then cooled.

Production Example 10

Anionic electrocoating composition

Part A

| Ingredients | Parts by weight (g) |
|---|---|
| Epototo YD-014* | 950 |
| Ethylene glycol monoethyl ether | 240 |
| Hydroquinone | 10 |
| Acrylic acid | 65 |
| Dimethylbenzylamine | 5 |

*An epoxy resin having an epoxy equivalent of 950 commercially available from Toto Kasei K.K.

Epototo YD-014 and ethylene glycol monoethyl ether were poured into a 2 liter flask equipped with a condenser and slowly heated to 120° C. with stirring to uniformly dissolve Epototo YD-014. Hydroquinone was added to the flask and then acrylic acid and dimethylbenzylamine were added. Reaction was carried out at 120° C. for 4 hours and it was identified that an acid value is not more than 1.

| Part B | |
|---|---|
| Ingredients | Parts by weight (g) |
| Maleic polybutadiene resin of Production Example 1 | 125 |
| The reaction product of Part A | 75 |
| Butylated melamine (Nonvalatile content 50%) | 40 |
| A nonionic surfactant* | 2 |
| Cobalt naphthenate | 3 |
| Triethylamine | 13 |
| Deionized water | 642 |

*NEWCOL-710F available from Nihon Nyukazai Co. Ltd.

The maleic polybutadiene resin, the reaction product of Part A and butylated melamine were added to a vessel, to which the nonionic surfactant and cobalt naphthenate were added to uniformly mix. Triethylamine and deionized water were slowly added with mixing to obtain a paint bath having a solid content of 20%.

Production Example 11

Part A

| Ingredient | Parts by weight (g) |
|---|---|
| Epicoat 1004* | 1000 |
| Ethylene glycol monoethyl ether | 343 |
| Hydroquinone | 10 |
| Acrylic acid | 76.3 |
| N,N-dimethylaminoethanol | 5 |

*A bisphenol type epoxy resin having an epoxy equivalent of 950 commercially available from Shell Company.

Epicoat 1004 was dissolved in ethylene glycol monoethyl ether. Acrylic acid, hydroquinone and N,N-dimethylaminoethanol were then added and heated to 100° C. at which reaction was carried out for 5 hours to obtain a resin solution.

| Part B | |
|---|---|
| Ingredient | Parts by weight (g) |
| The aminated polybutadiene resin of Production Example 4 | 400 |
| The resin solution of Part A | 240 |
| The half esterified maleic polybutadiene of Production Example 2 | 19.2 |
| Acetic acid | 8.1 |
| Deionized water | 1950 |

The aminated polybutadiene resin of Production Example 4, the resin solution of Part A and the half esterified maleic polybutadiene of Production Example 2 were uniformly mixed and acetic acid was then added with stirring. Deionized water was slowly added to obtain an aqueous solution having a solid content of about 20%.

Example 1

A dull steel panel treated with zinc phosphate was immersed in the aqueous dispersion paste A of Production Example 5 as an anode and a voltage sufficient to obtain a thickness of 20 micron was applied to conduct anionic electrocoating (first electrocoating). The panel was further electrocoated with the anionic electrocoating composition of Production Example 10 (second electrocoating). The panel was rinsed with water and cured at 170° C. for 20 minutes to obtain a coated panel having a film thickness of 30 micron.

The resultant coated panel was scribed crosswise and a salt spray test was carried out in a salt spray test for 120 hours or 240 hours. A width of rust and blister from the scribed portion was measured to show in Table 1.

Example 2

A coated panel having a film thickness of 30 micron was obtained as generally described in Example 1 with the exception that, in the first electrocoating, the aqueous dispersion paste B of Production Example 6 was employed instead of the paste A of Production Example 5.

The same corrosion resistance test was carried out. The result is shown in Table 1.

Example 3

A coated panel having a film thickness of 30 micron was obtained as generally described in Example 1 with the exception that, in the first electrocoating, the aqueous dispersion paste C of Production Example 7 was employed instead of the paste A of Production Example 5.

The same corrosion resistance test was carried out. The result is shown in Table 1.

Example 4

A dull steel panel treated with zinc phosphate was immersed in the aqueous dispersion paste D of Production Example 8 as a cathode and a voltage sufficient to obtain a thickness of 20 micron was applied to conduct cationic electrocoating (first electrocoating). The panel was further electrocoated with the cationic electrocoating composition of Production Example 11 (second electrocoating). The panel was rinsed with water and cured at 170° C. for 20 minutes to obtain a coated panel having a film thickness of 30 micron.

The same corrosion resistance test was carried out. The result is shown in Table 1.

Example 5

A coated panel having a film thickness of 30 micron was obtained as generally described in Example 4 with the exception that, in the first electrocoating, the aqueous dispersion pasted E of Production Example 9 was employed instead of the paste D of Production Example 8.

The same corrosion resistance test was carried out. The result is shown in Table 1.

Comparative Example 1

For a comparison, a coated panel was obtained without conducting the first electrocoating. Anionic electrocoating was carried out only using the anionic electrocoating composition of Production Example 10 and the panel was cured at 170° C. for 20 minutes after rinsing to obtain a panel having a film thickness of 30 The same corrosion resistance test was carried out. The result is shown in Table 1.

Comparative Example 1

For a comparison, a coated panel was obtained without conducting the first electrocoating.

Cationic electrocoating was carried out only using the cationic electrocoating composition of Production Example 11 and the panel was cured at 170° C. for 20 minutes after rinsing to obtain a panel having a film thickness of 30 micron.

The same corrosion resistance test was carried out. The result is shown in Table 1.

TABLE 1

| Example numbers | Width of rust and blister (mm) |
|---|---|
| 1 | 5 (120 hours) |
| 2 | 4 (120 hours) |
| 3 | 5 (120 hours) |
| 4 | 3 (240 hours) |
| 5 | 3 (240 hours) |
| Comparative Example | |
| 1 | 10 (120 hours) |
| 2 | 5 (240 hours) |

What is claimed is:

1. A multiple electrocoating process comprising coating on a substrate a first electrocoating composition, coating a second electrocoating composition on the uncured first electrocoating composition and then curing all electrodeposited coatings, characterized in that the first electrocoating composition is an aqueous dispersion containing micro gel particles having an electric charge, which is prepared by;
   emulsifying in an aqueous medium a resin composition consisting essentially of
   (A) 100 parts by weight of a cationic or anionic film-forming aqueous resin, and
   (B) 10 to 250 parts by weight of a thermosetting crosslinking agent which is self-crosslinked or crosslinked with said aqueous resin (A) in terms of condensation or addition reaction; said parts by weight being based on the solid content of the resin composition, and
   heating the resultant emulsion to above a crosslinkable temperature of said crosslinking agent (B); and said second electrocoating composition comprises a cationic or anionic film-forming aqueous resin (C) and a thermosetting crosslinking agent (D) which is self-crosslinked or crosslinked with said aqueous resin (C).

2. The process according to claim 1 wherein the cationic aqueous resin (A) is a polybutadiene having amino groups.

3. The process according to claim 2 wherein the crosslinking agent (B) is methylol phenols obtained by reacting phenols with formaldehyde.

4. The process according to claim 3 wherein the methylol phenols are beta-hydroxyphenol ether.

5. The process according to claim 2 wherein the crosslinking agent (B) is tetrabromobisphenol A.

6. The process according to claim 1 wherein the anionic aqueous resin (A) is selected from the group consisting of maleic oil, a maleic polybutadiene resin and an anionic acryl resin.

7. The process according to claim 6 wherein the crosslinking agent (B) is methylol phenols obtained by reacting phenols with formaldehyde.

8. The process according to claim 6 wherein the methylol phenols are a melamine resin.

9. The process according to claim 1 wherein the heating is conducted at atmospheric pressure or under pressure.

10. The process according to claim 1 wherein the emulsion additionally comprises an organic solvent which is removed before or during the heating step.

11. The process according to claim 1 or claim 10 wherein the emulsion further comprises a solid particle.

12. The process according to claim 11 wherein the solid particle is selected from the group consisting of a pigment and a metal particle.

13. An article coated by the process of anyone of claims 1 to 12.

* * * * *